June 11, 1935.  F. H. WANDELL  2,004,842

BRAKE

Filed March 26, 1934

INVENTOR
FREDERIC H. WANDELL.
BY
ATTORNEYS

Patented June 11, 1935

2,004,842

UNITED STATES PATENT OFFICE 2,004,842

BRAKE

Fredric H. Wandell, Los Gatos, Calif.

Application March 26, 1934, Serial No. 717,465

1 Claim. (Cl. 188—234)

This invention relates to improvements in brakes and has particular reference to a rivetless brake shoe and liner therefor.

The principal object of the invention is to produce a brake wherein the lining may be quickly taken off and replaced.

A further object is to provide a brake wherein the use of rivets is eliminated, which rivets often cause scoring of the brake drums.

A further object is to produce a lining which will have a longer useful life.

A still further object is to produce a device which may be applied to any motor vehicle by an unskilled person, and without the employment of special tools.

Other objects and advantages will be apparent during the course of the following description.

Figure 1:
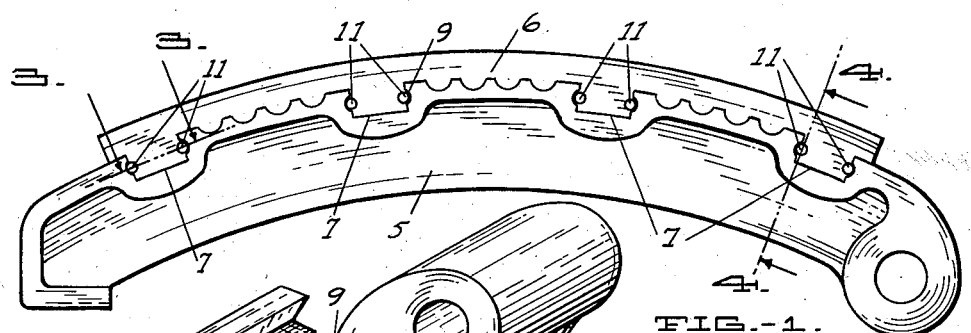
Figure 2:
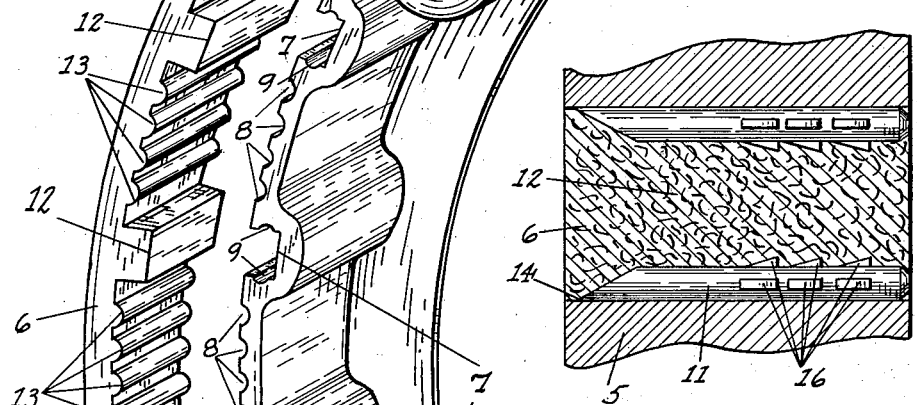
Figure 3:
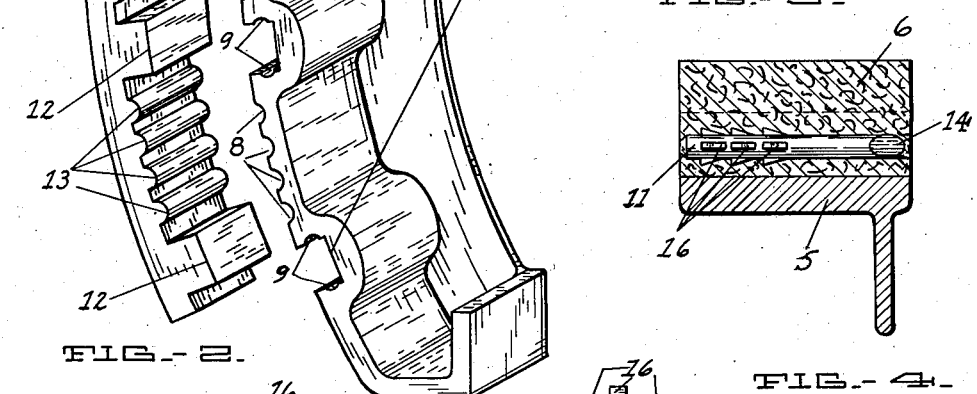
Figure 4:
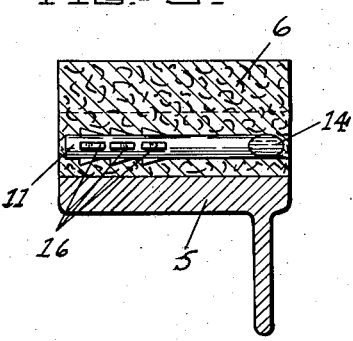
Figure 5:
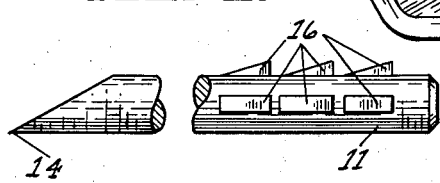

In the accompanying drawing forming a part of this specification and in which like numerals are employed to designate like parts throughout the same, Fig. 1 is a side elevation of a brake shoe having my lining applied thereto, Fig. 2 is a perspective view of the brake shoe and lining in separated relation, Fig. 3 is an enlarged cross sectional view on the line 3—3 of Fig. 1, Fig. 4 is an enlarged cross sectional view on the line 4—4 of Fig. 1, Fig. 5 is an enlarged side elevation of one of the locking pins, and Fig. 6 is an end elevation of Fig. 5.

It is ordinary practice to apply a brake lining to a brake shoe through the use of copper rivets which pass through the brake lining and brake shoe and thus hold one to the other. The placing of rivets through the lining weakens the structure thereof and at the same time as the lining wears away the rivet comes into engagement with the surface of the brake drum and through contact therewith causes a roughened or scored surface to appear in the brake drum. With applicant's structure the rivets have been eliminated thus making a stronger brake lining and also a brake lining which will not score the brake drum.

In the accompanying drawing wherein for the purpose of illustration is shown a preferred embodiment of my invention, the numeral 5 designates any standard form of brake shoe and as brake shoes are common, further comment thereon will not be necessary. The numeral 6 designates a brake lining which is preferably cast so as to interlock with the brake shoe 5 and by viewing Figs. 1 and 2 it will be noted that the brake shoe has a series of offset recesses 7 and a series of transverse depressions 8. Each one of the offset recesses has a groove 9 which is adapted to receive locking pins 11, to be later described. The brake lining has a series of offset lugs 12 which correspond to the offset recesses 7. The brake lining also has a series of transverse ribs 13 which correspond to the transverse grooves 8. Referring to Fig. 5, it will be noted that the locking pins are pointed as at 14 and have a series of teeth 16 formed on three sides thereof.

In assembling a brake portion to a brake shoe it is only necessary to slide the brake band onto the brake shoe so that the offset portions 12 enter the recesses 7, after which the pins 11 are driven into place so that they lie between the grooves 9 and the lugs 12. The position of these pins is well shown in Fig. 1. Therefore, it will be apparent that an unskilled person may quickly remove and replace a worn brake lining with a minimum amount of effort and without the employment of special tools.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, the combination with a brake shoe, having offset recesses formed therein said recesses being spaced one from the other, transverse grooves formed in the face of said brake shoe and positioned between said offset recesses, and a brake lining engaging said brake shoe, the brake lining having offset ribs corresponding to the grooves formed in said shoe, said brake lining having offset lugs adapted to enter said recesses, said recesses having grooves formed in the sides thereof, and locking pins interposed between said lugs and said brake shoe and resting in said grooves formed in said offset recesses.

FREDRIC H. WANDELL.